P. KELLEHER & J. C. RANDLETT.

Moccasin Boot-Pacs.

No. 6,098. Reissued Oct. 27, 1874.

Witnesses:
Geo. T. Smallwood.
W. R. Edelen

Patrick Kelleher
James C. Randlett
Inventors.
by
John J. Halsted
their Atty.

THE GRAPHIC CO. PHOTO-LITH. 39 & 41 PARK PLACE, N.Y.

UNITED STATES PATENT OFFICE.

PATRICK KELLEHER AND JAMES C. RANDLETT, OF BANGOR, MAINE.

IMPROVEMENT IN MOCCASIN BOOT-PACKS.

Specification forming part of Letters Patent No. 122,030, dated December 19, 1871; reissue No. 6,098, dated October 27, 1874; application filed March 24, 1874.

*To all whom it may concern:*

Be it known that we, PATRICK KELLEHER and JAMES C. RANDLETT, both of Bangor, in the county of Penobscot and State of Maine, have invented certain new and useful Improvements in the Manufacture of Moccasin-Boots or Boot-Packs; and we do hereby declare that the following is a full and exact description thereof, reference being had to the accompanying drawings and to the letters of reference marked thereon.

The nature of our invention consists in so cutting the leather or material of which the packs are manufactured as to be able to do all the sewing of the upper parts by machinery instead of by hand, the latter being the method necessarily employed at present; and it also enables us to improve the shape, and to so change the position of some of the seams as to add very much to the durability, of the packs.

Figure 1:
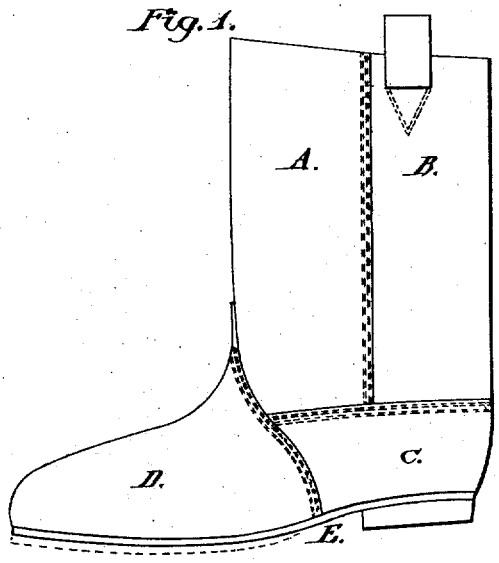
Figure 2:
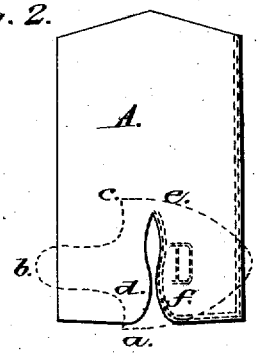
Figure 3:
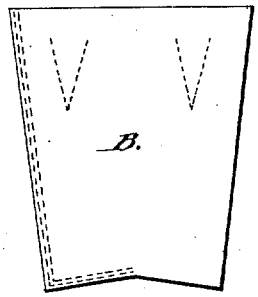
Figure 4:
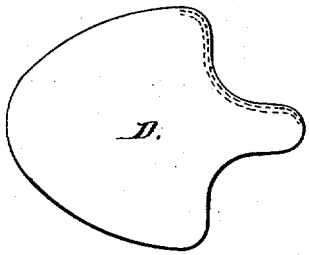
Figure 5:
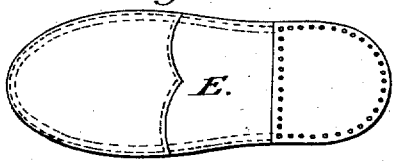
Figure 6:
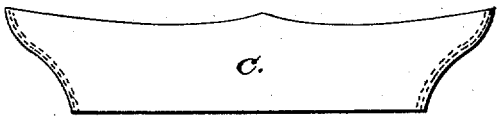
Figure 7:
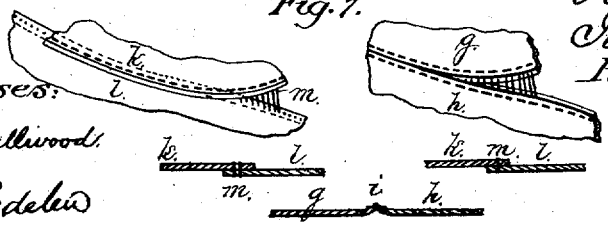

In the accompanying drawings, Figure 1 is a boot-pack made after our improved patterns, showing where the pieces are sewed together to form the complete boot-pack. Fig. 2 is the front of the leg, the dotted lines at its left side showing how the tip is laid onto the front of the leg, in order to crimp the tip and front together. Fig. 3 is the back of the leg. Fig. 4 is the vamp of the boot-pack. Fig. 5 is the sole. Fig. 6 is the quarter of the boot-pack. Fig. 7 illustrates the difference between the flat seam used in our mode of joining the parts together and the old seam heretofore used for that purpose.

The relative position of the parts is shown in Figs. 1 and 8. The leg of the boot-pack is made in two pieces, A B, Fig. 1, allowing two flat seams, both of which are stitched with two rows of stitches, and the leg is stiffened and stands up better with a seam on each side than it does with a single seam at one side or at the back of the leg. There is also a free selection of stock in relation to the service it is designed to sustain when the leg is made in two pieces, as A and B; but the principal benefit is found in the fact that the seams can be made flat and stitched by machinery, thus avoiding all hand-work. The quarter C is formed in one piece, crossing and passing forward of the seam in the leg and joining directly onto the vamp, and forming a flat seam both at its junction with the leg and with the vamp, allowing both of these seams to be stitched by machinery. The vamp D is also stitched to the front part of the leg A by similar flat seams, all the seams being flat lap-seams, thus allowing them all to be closed by sewing-machines, and avoiding hand-work altogether in sewing these parts of the pack, the seams having been heretofore made by abutting the edges of the leather together, one against the other, and then, by hand, sewing partially through the edge of the leather, as shown at *g h i*, Fig. 7. The vamp is different from all other vamps in not having the sides run back to form part of the quarter, but the sides of this vamp pass directly across the foot, simply obliquing a little toward the rear in passing down the sides of the foot, thus simplifying the seams and making it possible to perform all the sewing by machinery. The corner *a* of the tip D (see dotted lines in Fig. 2) is first placed on the corner *d* of the front A, the tongue *b* of the tip, and also the tip itself, lying across the front A. We then start the sewing-machine and stitch, following along close to the edge *a b* of the tip D, at the same time turning the tip D on the front A until the end of the tongue *b* shall come around to *e* on the front, and the stitches passing along the tongue *b* of the tip from *a* to *b* shall pass through the front A, following along from *d* to *c*, close to the edge, and operating in such a manner that when the stitching is completed from *a* to *b* of the tip, it shall also be completed from *d* to *e* of the front, and the two parts shall be stitched and crimped together from *a* to *b* of the tip, and from *d* to *e* of the front. The stitching is then continued along the tongue of the tip from *b* to *c*, and along the front from *e* to *f*, while the tongue is turned in the proper direction and the parts are stitched together so that the corner *a* of the tip is joined to the edge *d* of the front. The end *b* of the tongue is then in its proper position at *e* on the tip, and the points *a* and *c* of the tip are in their respective positions at *d* and *f* on the front. The method of turning the tip while the process of stitching it onto the front progresses crimps the parts together and causes them to improve the shape of the moccasin. Fig. 7 is intended to illustrate the difference between a seam formed by abutting the edges of the leather together, one against the other, and sewing partially through the edge of the leather, as shown at *g h i*, and a seam formed by lapping the edges of the leather one upon the other, and overlapping one the other, to form a flat lap-seam which shall allow of using one or more rows of stitches, more or less removed from the actual edge of the leather, as shown at *k l m*.

In all former methods of manufacturing moccasins, the seam formed by butting the edges together, as shown at *g h i*, Fig. 7, has been used, and the edges have been butted together and joined, as described; but in order to admit of the application of machinery to sew the seams of our moccasins together, we were obliged first to invent and construct the new patterns herein shown and described, and then, in order to join these new patterns together by machine sewing, we were compelled to devise a new method of sewing the tip D onto the front A of the moccasin, as described above.

The upper parts having been all joined together, the edges are turned over a last, and the sole is fitted on and held to the upper parts by nails or brads, until it is sewed through and through, making this also a flat seam, and giving a good shape to the pack.

A piece of the same material, and of the same thickness as the uppers, is fitted in on the inside of the sole between the edges of the uppers, to level up and make a smooth bearing for the bottom of the foot.

The shape of the different parts of the boot-pack allows the manufacturer to select with reference to the wear and tear of the particular part for which the stock is to be used, and thereby economize the use of the most expensive stock, and the shape of the parts and the adoption of the flat lap-seam enable all the seams to be closed by machinery. A heel and tap may be added at pleasure, either by sewing or pegging.

The different parts of this boot-pack are designed and arranged expressly with a view to enable all the seams to be closed by machinery, and to dispense with the hand-work altogether in the sewing, even to sewing on the soles; and for this purpose all the patterns have been simplified and the lap-seam adopted, and it is believed that there never was a pack made heretofore in which lap-seams were used exclusively, nor in which all the seams, even to sewing on the soles, could be accomplished by machinery; but by the use of these patterns and the lap-seams every seam may be closed on a machine, thereby reducing the cost of manufacturing very materially, enabling them to be made more rapidly, and allowing the thick, heavy, and expensive leather to be used for soles, and the lighter and less expensive leather can be used for uppers.

The leather of which the packs or moccasins is made in the present state of the art is, as is well known, of a spongy, porous nature, and is assorted into two kinds, the thicker kind, called "picker" leather, being that which is used for the part D or vamp and for soles, and the thinner kind, called "lace" leather, being that which is used for the leg of a boot. There is no wax used in preparing it or in dressing it, and it is not intended to be waterproof. It is therefore in condition, even in the thick picker leather, to be thoroughly softened by soaking in water preparatory to being sewed, thus rendering it capable of being so bent, stretched, and compacted edgewise or in the plane of its surface, when the tongue of the vamp is being sewed to the front of the leg, that two edges of different shapes and of different lengths are united together, and this is effected, without any previous lasting or stretching to shape, by means of lasts or trees, and without any subsequent ironing or smoothing, as in tailors' work, to give a spring to the goods. The packs are not made water-proof for the purpose of use in wet places, but, on the contrary, they are for use in dry weather and in dry snow, and for work in the woods.

We disclaim all usual modes of stretching, crimping, or shaping the vamps or insteps of ordinary boots.

What we claim as our invention, and wish to secure by Letters Patent, is—

1. A moccasin-boot or boot-pack formed of the parts A B C D E, cut as shown and described, and joined together by flat lap-seams.

2. A moccasin boot or pack, with the leg formed of the two flat pieces A and B, cut as shown and described, and united by two lapped seams, one on each side of the leg, as shown and described.

3. The quarter C of a moccasin-pack, cut in the form shown and described, and formed entire in one piece, for the use as specified.

4. The described process of smooth-crimping the instep of a pack or moccasin, consisting in cutting the tip D and front A with edges of different lengths, and of dissimilar outlines, and bending, stretching, and compacting the edges in the act of sewing with a flat seam, so as to cause them to coincide under the needle, the joining of the differential edges displacing and forcing out the leather of the two parts in such manner as to form the crimp.

JAMES CROSBY RANDLETT.
PATRICK KELLEHER.

Witnesses:
FRED. H. COOMBS,
FRED. W. SARGENT.